US012603521B2

(12) United States Patent
Abiri et al.

(10) Patent No.: US 12,603,521 B2
(45) Date of Patent: Apr. 14, 2026

(54) SMART WIRELESSLY CHARGING BATTERY

(71) Applicant: GuRu Wireless, Inc., Pasadena, CA (US)

(72) Inventors: Behrooz Abiri, Pasadena, CA (US);
Chris Keller, Pasadena, CA (US);
Raimond Ghazarian, Pasadena, CA (US)

(73) Assignee: GuRu Wireless, Inc., Pasadena, CA (US)

( * ) Notice: Subject to any disclaimer, the term of this patent is extended or adjusted under 35 U.S.C. 154(b) by 648 days.

(21) Appl. No.: 18/123,204

(22) Filed: Mar. 17, 2023

(65) Prior Publication Data

US 2023/0299613 A1     Sep. 21, 2023

Related U.S. Application Data

(60) Provisional application No. 63/321,050, filed on Mar. 17, 2022.

(51) Int. Cl.
| | |
|---|---|
| *H02J 7/00* | (2026.01) |
| *H02J 50/00* | (2016.01) |
| *H02J 50/20* | (2016.01) |
| *H02J 50/40* | (2016.01) |

(52) U.S. Cl.
CPC .......... *H02J 50/005* (2020.01); *H02J 7/0045* (2013.01); *H02J 50/20* (2016.02); *H02J 50/402* (2020.01); *H02J 2207/20* (2020.01)

(58) Field of Classification Search
USPC ......................................................... 320/108
See application file for complete search history.

(56) References Cited

U.S. PATENT DOCUMENTS

| | | | |
|---|---|---|---|
| 10,367,380 B2 | 7/2019 | Sengupta et al. | |
| 2006/0207442 A1* | 9/2006 | Pettersson | H05B 6/6408 |
| | | | 99/517 |
| 2018/0034325 A1* | 2/2018 | Apostolos | H02J 50/27 |

* cited by examiner

*Primary Examiner* — Samuel Berhanu
(74) *Attorney, Agent, or Firm* — Weaver Austin Villeneuve & Sampson LLP

(57) ABSTRACT

A wireless charging system includes, in part, a first board, a multitude of rectenna boards, and a second board. The first board is adapted to receive a bottom portion of a rechargeable battery, and includes, in part, a ground plane, a first multitude of receptacles positioned along a perimeter of the first board, and circuitry adapted to convert a received RF signal to a DC voltage for delivery to the rechargeable battery. Each rectenna board is associated with and adapted to be inserted into a different one of the first multitude of receptacles. Each rectenna board includes, in part, a multitude of receive antennas for receiving the RF signal. The rectenna boards are adapted to enclose the rechargeable battery when the rechargeable battery is positioned over the first board. The second board is adapted to engage with the rectenna boards to cover a top portion of the rechargeable battery.

8 Claims, 5 Drawing Sheets

100

210

280

210

290

110

212

214

232

212

210

212

SMART WIRELESSLY CHARGING BATTERY

RELATED APPLICATION

The present application claims benefit under 35 USC 119(e) of U.S. Patent Application No. 63/321,050, filed Mar. 17, 2022, the content of which is incorporated herein by reference in its entirety.

TECHNICAL FIELD

The present application relates to electronic systems, and more particularly to batteries that can be recharged wirelessly.

BACKGROUND

Radio frequency (RF) lensing at mm-wave frequencies provides an efficient method to transmit power wirelessly from one device to another. RF lensing utilizes an array of synchronized controllable transmitting antennas to create a converging spherical RF wave. The shape of the converging wavefront can be adjusted dynamically so that the RF power is focused on the receiving unit. Through proper design of the antenna array, a large portion of the RF energy emitted from the antenna array will be collected at the focal point, thereby resulting in a relatively high efficiency transfer of energy from an RF power generation unit to an RF power recovery unit.

SUMMARY

A wireless charging system, in accordance with one embodiment of the present disclosure includes, in part, a first board, a multitude of rectenna boards, and a second board. The first board is adapted to receive a bottom portion of a rechargeable battery, and includes, in part, a ground plane, a first multitude of receptacles positioned along a perimeter of the first board, and circuitry adapted to convert a received RF signal to a DC voltage for delivery to the rechargeable battery when the rechargeable battery is positioned over the first board.

Each rectenna board is associated with and adapted to be inserted into a different one of the first multitude of receptacles. Each rectenna board includes, in part, a multitude of receive antennas for receiving the RF signal. The rectenna boards are adapted to enclose the rechargeable battery when the rechargeable battery is positioned over the first board. The second board is adapted to engage with the rectenna boards to cover a top portion of the rechargeable battery when the rechargeable battery is positioned over the first board.

In one embodiment, the wireless charging system further includes, in part, a rechargeable battery. In one embodiment, the wireless charging system further includes, in part, a third board adapted to be inserted in a second receptacle positioned on the first board. The third board is further adapted to be connected to a positive terminal of the rechargeable battery when the rechargeable battery is positioned over the first board. In one embodiment, the second board engages with the rectenna boards using a multitude of protrusions and cavities. In one embodiment, the circuitry includes, in part, an RF-to-DC converter, a DC-to-DC converter, a power management circuit, a wireless communication circuit, and a controller.

A method of charging a rechargeable battery using RF signals, in accordance with one embodiment of the present disclosure, includes, in part, placing a bottom portion of a rechargeable battery on a first board that, in turn, includes, a multitude of receptacles positioned along a perimeter of the first board; inserting a multitude of rectenna boards into the first multitude of receptacles; and covering a top portion of the rechargeable battery with a second board adapted to engage with the multitude of rectenna boards.

In one embodiment, the first board further includes, in part, a ground plane coupled to a negative terminal of the battery, and circuitry adapted to convert the RF signal to a DC voltage for delivery and charging the rechargeable battery. In one embodiment, each rectenna board includes, in part, a multitude of receive antennas for receiving the RF signal. The rectenna boards are adapted to enclose the perimeter of the rechargeable battery along a height of the rechargeable battery In one embodiment, the method further includes, in part, inserting a third board in a second receptacle positioned on the first board. The third board is further adapted to be connected to a positive terminal of the rechargeable battery. In one embodiment, the second board engages with the plurality of rectennas using a multitude of protrusions and cavities. In one embodiment, the circuitry includes, in part, an RF-to-DC converter, a DC-to-DC converter, a power management circuit, a wireless communication circuit, and a controller.

DETAILED DESCRIPTION

In accordance with embodiments of the present disclosure, a rechargeable battery disposed in an electronic device is adapted to include an integrated recovery unit (RU) so as to be charged wirelessly. Accordingly, the electronic device that is being powered by the battery requires no modification to be wirelessly charged. The battery may have the same form factor and supply the same output voltage as those of commercially available batteries, such as AAA, AA, C, D, or 9V batteries.

Figure 1:
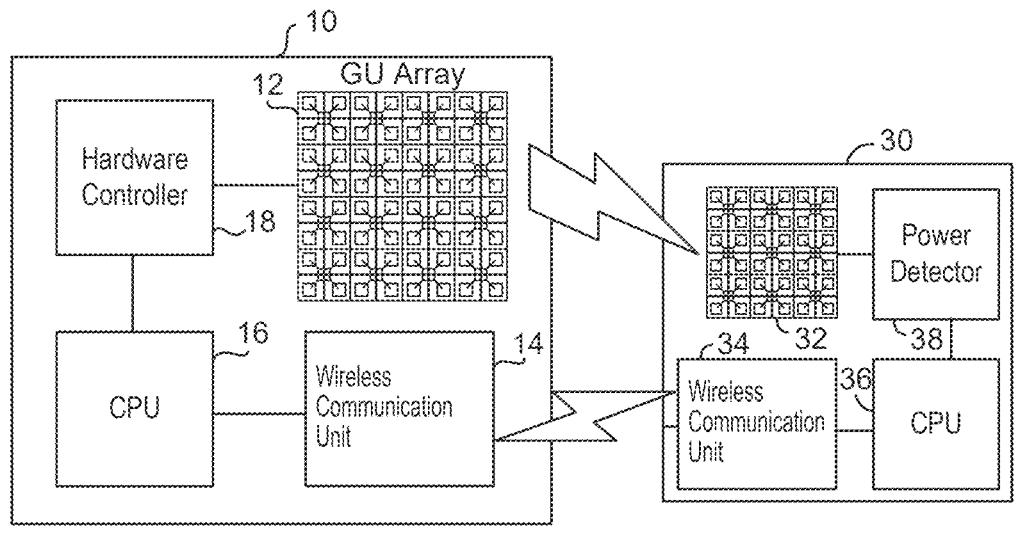
FIG. 1 is a simplified high-level view of an RF power generating unit transmitting RF signals to a recovery unit.

FIG. 1 shows a simplified high-level view of an RF power transmitting/generating unit 10 (alternatively referred to herein as GU) configured to transmit RF signals to a recovery/receiving unit 30 (alternatively referred to herein as RU). GU 10 is shown, as including, in part, an array of transmit antennas 12, a wireless communication link 14, a central processing unit (CPU) 16, and a hardware controller 18. RU 30 is shown as including, in part, an array of receive antennas 32, a wireless communications link 34, a CPU 36, and a power detector 38. U.S. Pat. No. 10,367,380, the content of which is incorporated herein by reference in its entirety, describes a system for wirelessly transferring power.

The RF signals transmitted by the array of transmit antennas 12 are received by the array of receive antennas 32 and converted to DC power using power detector 38 and CPU 36. Power detector 38 is adapted to, among other functions, detect the power of a battery disposed in RU 30, convert the received RF power to DC power, and condition the DC power to a voltage level required by the battery. GU 10 and RU 30 communicate with one another using a wireless communication link established between units 14 and 34.

Figure 2:
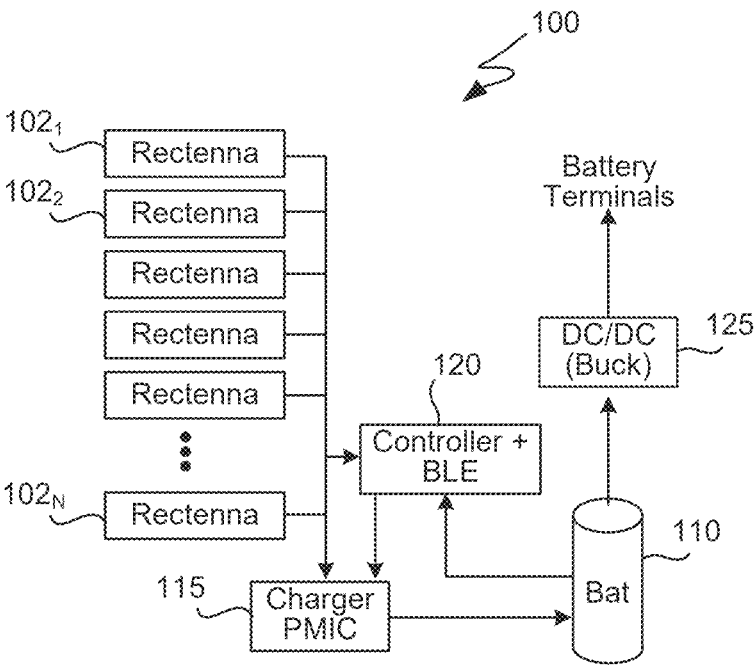
FIG. 2 shows a number of blocks of a wirelessly rechargeable battery, in accordance with one embodiment of the present disclosure.

FIG. 2 shows a number of blocks of a wirelessly rechargeable battery 100, in accordance with one embodiment of the present disclosure. Wirelessly rechargeable battery 100 is shown as including, in part, a rechargeable battery 110, such as a Lithium-ion battery or a Nickel Metal hydride (NiMh) battery, a multitude of receive antennas (alternatively referred to herein as rectennas) $102_i$ (i is an index ranging from 1 to N in this example, and N is an integer equal to or greater than one) such as mm-wave rectifiers and/or printed circuit board (PCB) antennas, a power management integrated circuit (PMIC) battery charger 115, a controller circuit 120 that includes an RF communication circuitry (such as Bluetooth low energy (BLE), Bluetooth, WiFi, Zigbee), and a DC-to-DC converter (such as a buck converter) 125 configured to supply a voltage matching the voltage required to charge the rechargeable battery 110. For example, if the electronic device is a smoke alarm operating using a commercially available 9-volt battery that is being replaced by a wirelessly chargeable battery 100, the DC-to-DC converter 125 supplies 9 volts to the rechargeable battery 110.

The controller 120 monitors the battery 110's charge status and once battery 110's state of charge drops below a first threshold level, controller 120 communicates to GU 10 (see FIG. 1) via the BLE communication circuit to initiate the wireless power transmission. The PMIC 115 extracts available power from the RF signals received by the rectennas and charges the battery. Once the state of charge of the battery 110 surpasses a second threshold level, controller 120 sends a request to GU 10 to stop the wireless power transmission. The controller 120 also provides on-demand information about the system status such as battery 110's state of charge, charging rate, discharge rate, etc. to the GU 10 or any other device (such as smartphones) that is authorized to communicate with controller 120.

Figure 3:
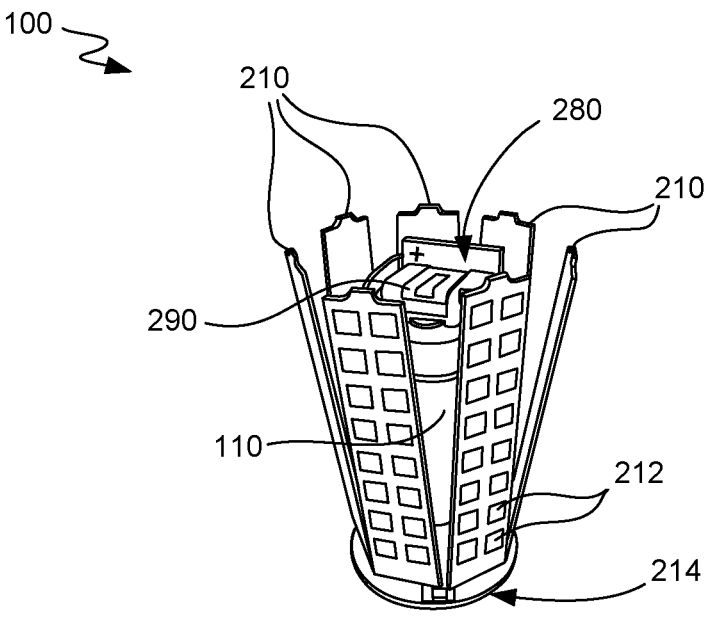
FIG. 3 is an exploded perspective view of a wirelessly rechargeable battery, in accordance with one exemplary embodiment of the present disclosure.

FIG. 3 is an exploded perspective view of a wirelessly rechargeable battery 100, in accordance with one exemplary embodiment of the present disclosure. Wirelessly rechargeable battery 100 is shown as including, in part, a rechargeable battery 110 that is assumed to be a 3.7 volts Li-ion battery in this example, and seven rectenna boards 210 disposed throughout the perimeter and along the height of rechargeable battery 110. The rectenna boards 210, which are shown in FIG. 3 as being in partially open position, are inserted in a multitude of receptacles mounted on controller board 214 adapted to be positioned along a bottom portion of rechargeable battery 110, as described further below. In one embodiment, the rectenna boards are rectangular rigid PCBs, PCB antennas and rectifier integrated circuits (ICs) that enclose the perimeter of the battery in a tiled format. In another embodiment, the rectenna boards (including the antennas) may be formed using flexible PCB material that wrap around the rechargeable battery.

Board 280, which is also adapted to be mounted on controller board 214, is adapted to securely hold rechargeable battery 110 in place and provide electrical connectivity to battery 110's positive terminal via metallic plate 290. The negative terminal of battery 110 is adapted to be connected to a ground plane (not shown) of controller board 214—which is a multi-layer PCB.

Figure 4:
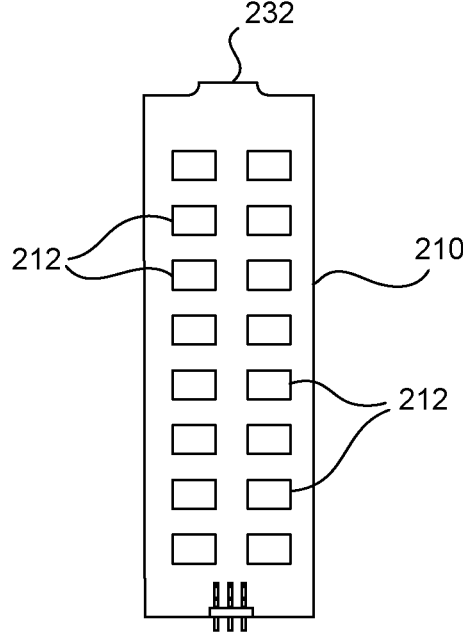
FIG. 4 is a front view of a rectenna board as used in the wirelessly rechargeable battery of FIG. 3, in accordance with one exemplary embodiment of the present disclosure.

FIG. 4 is a front view of a rectenna board 210 shown as having 16 receive antennas 212 adapted to receive the RF signal transmitted by GU 10 of FIG. 1. Referring to FIGS. 2, 3 and 4 concurrently, the received RF signals are converted to a level-specific DC voltage using DC-to-DC converter 125, PMIC 115, and controller 120. The converted DC voltage recharges rechargeable battery 110. Rectenna board 210 is also shown as including, in part, a protrusion 232, and three metallic prongs 234 adapted to be inserted in a corresponding receptacle disposed on the controller board 214 to provide, among other operations, electrical connectivity between the various components of wirelessly rechargeable battery 100, and further to securely hold the rectenna board on controller board 214.

Figure 5:
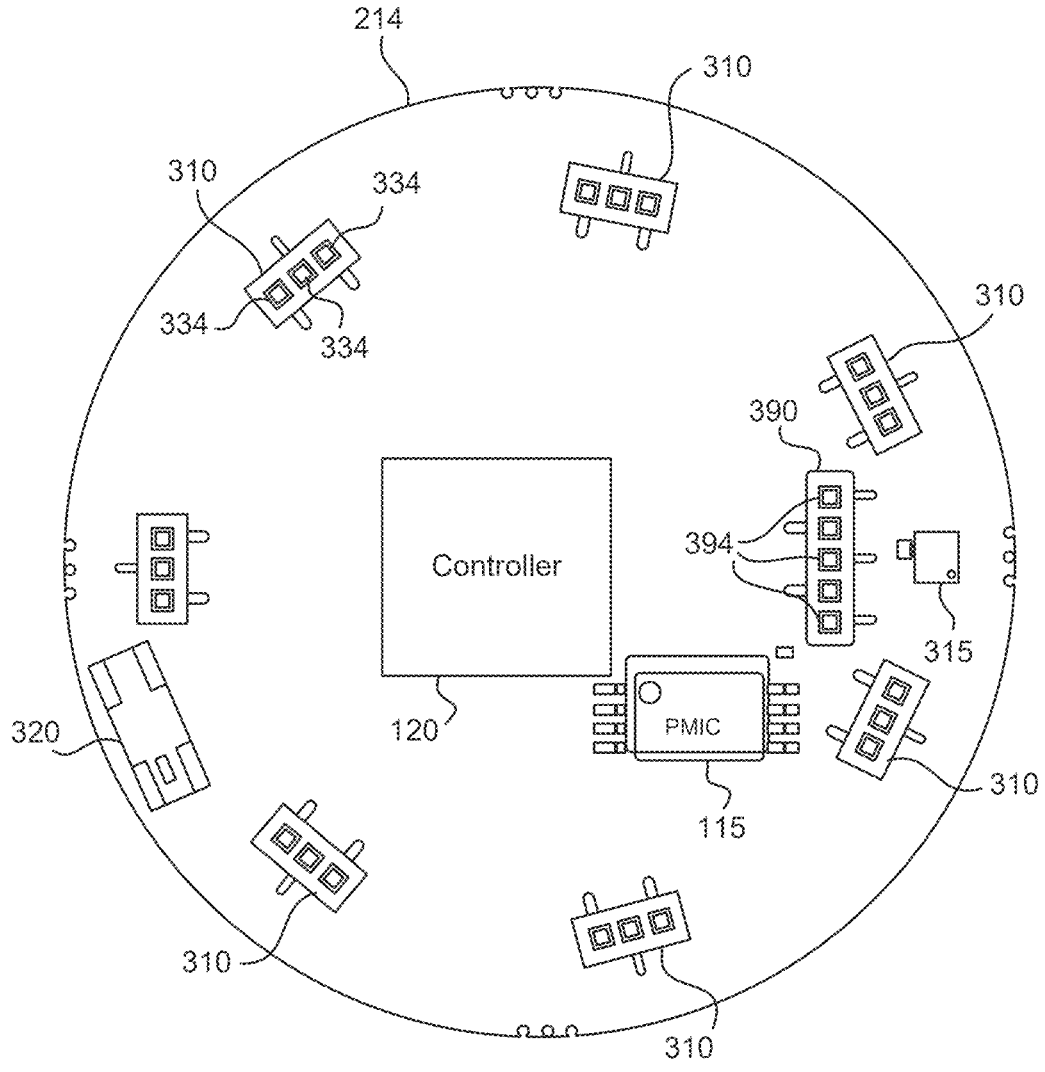
FIG. 5 is a top view of a controller board as used in the wirelessly rechargeable battery of FIG. 3, in accordance with one exemplary embodiment of the present disclosure.

FIG. 5 is a top view of controller board 214, in accordance with one exemplary embodiment of the present disclosure. Controller board 214 is adapted to receive and underlay the bottom portion of rechargeable battery 110. Controller board 214 may be, for example, a six-layer printed circuit board (PCB) with 6 layers of metal traces (not shown) to provide electrical connectivity between the various components of wirelessly rechargeable battery 100. One of the layers of the PCB is a ground plane to which the negative terminal of rechargeable battery is connected. As seen from FIG. 5, disposed, in part, on controller board 214 are seven receptacles 310 each associated with and adapted to receive a different one of the rectenna boards 210, a PMIC battery charger IC 115, a controller unit (such as a micro-controller unit (MCU)) 120, a BLE antenna 320, a DC-to-DC converter 315, and a receptacle 390 adapted to receive board 280 and provide, among other operations, electrical connectivity to the rechargeable battery 110 and top cover board 400, described below with reference to FIG. 7. Each receptacle 310 is shown as having three openings adapted to receive the three prongs 234 of the associated rectenna board 210 to maintain the rectenna board securely in place using, for example, a spring-loaded mechanism.

Figure 6:
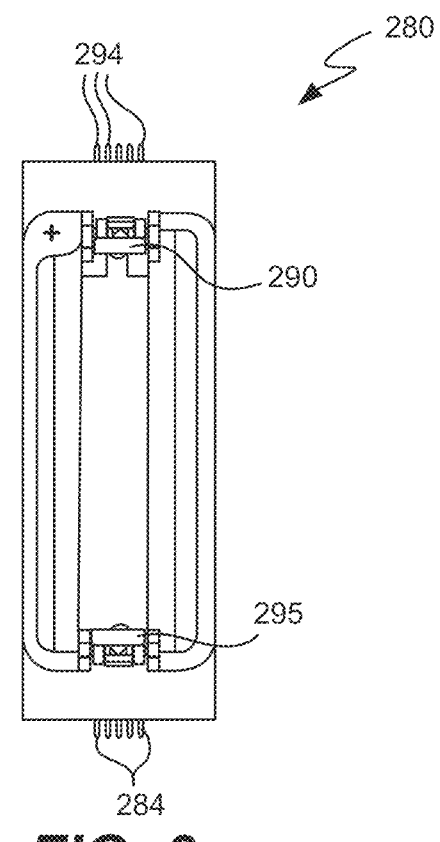
FIG. 6 is a front view of a board that gets inserted into the controller board of FIG. 5 to securely hold the rechargeable battery in position in accordance with one exemplary embodiment of the present disclosure.

FIG. 6 is a front view of board 280, in accordance with one embodiment of the present disclosure. As was described above, board 280 is adapted to be inserted in receptable 390 of controller board 214. To achieve this, board 280 is adapted to include 5 metallic prongs 284 that are inserted into the 5 openings 394 of receptacle 390. Metallic plate 290 is adapted to be connected to battery 110's positive terminal, and metallic plate 295 is adapted to connected to battery 110's negative terminal. Board 280 is also shown as including 5 metallic prongs 294 that are adapted to be inserted into corresponding 5 openings of receptacle 450 disposed on cover board 400, described further below.

Figure 7:
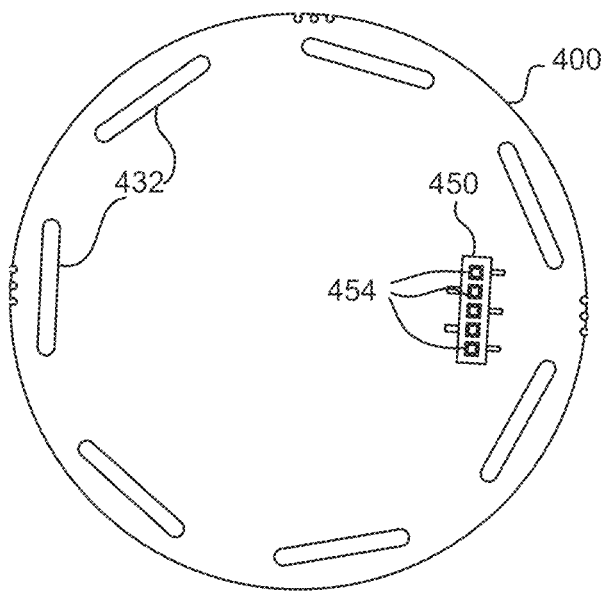
FIG. 7 is a top view of a cover board as used in the wirelessly rechargeable battery of FIG. 3, in accordance with one exemplary embodiment of the present disclosure.

FIG. 7 is a top view of cover board 400 adapted to be positioned along a top portion of wirelessly rechargeable battery 100, in accordance with one exemplary embodiment of the present disclosure. Cover board 400 includes seven cavities 432 each adapted to receive and engage with a protrusion 232 of a different one of the rectenna boards so as to enclose the rechargeable battery 110. To achieve this, in one embodiment, after placing rechargeable battery 110 on controller board 214, the rectenna boards 210 are inserted in receptacles 330 as shown in FIG. 3. Thereafter, the rectenna boards are gently pushed toward the rechargeable battery while cover board 400 is positioned on top of the rechargeable battery and adjusted so that each cavity 432 engages and mates with one of the protrusions 232 so to fully enclose the recharge battery 110. Cover board 400 is also shown as including a receptacle 450 that includes 5 openings 454 in which prongs 294 of board 280 are inserted. In one embodiment, cover board 400 provides connection to the positive terminal of the rechargeable battery via metallic plate 290 and one of the prongs 294. The other four pongs 294 of cover board 400 provide electrical connectivity to the controller board 214, which in turn through its *varus* metal layers provides electrical connections to PMIC 115, DC-to-DC converter 315, controller 210, BLE antenna 320 and a multitude of receive antennas 212 formed on rectenna boards 210.

Figure 8:
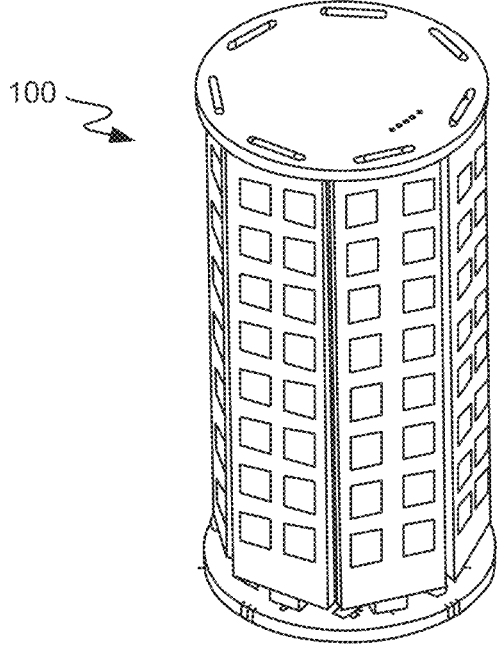
FIG. 8 shows a wirelessly rechargeable battery in an upright position after being fully enclosed between the controller board, the rectenna boards and the cover board, in accordance with one exemplary embodiment of the present disclosure.
Figure 9:
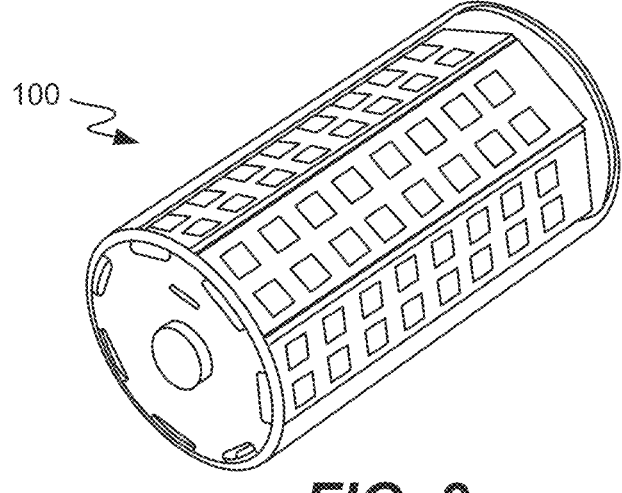
FIG. 9 shows a wirelessly rechargeable battery resting along its side after being fully enclosed between the controller board, the rectenna boards and the cover board, in accordance with one exemplary embodiment of the present disclosure.

FIG. 8 shows wirelessly rechargeable battery 100 in an upright position after the battery is fully enclosed between the controller board, the rectenna boards and the cover board. FIG. 9 shows wirelessly rechargeable battery 100 resting along its side after the battery is fully enclosed between the controller board, the rectenna boards and the cover board.

In one embodiment, the wirelessly rechargeable battery uses Bluetooth (see FIGS. 1 and 5) for both communication to GU 10 and to a smartphone or a hub. The Bluetooth connection to the smartphone or hub is used in conjunction with a software on the phone to provide report of the status of the battery (such as available charge, charging rate, last charging time, estimate of location of the battery). The phone can also be used to control the operation of the wirelessly rechargeable battery (such as requesting for wireless charging, setting priority, stop charging, disable the battery output to shut down the device it is powering).

In one embodiment, the wirelessly rechargeable battery uses WiFi for both communication to the GU, to a smartphone, or the internet. The WiFi connection to the internet may be used to connect to a server and allow accessing the battery from any location via internet. The WiFi connection to the internet may be used in conjunction with a software on the phone to provide report of the status of the battery (such as available charge, charging rate, last charging time, estimate of location of the battery). The phone can also be used to control the operation of the wirelessly rechargeable battery (such as requesting for wireless charging, setting priority, stop charging, disable the battery output to shut down the device it is powering).

The above embodiments of the present invention are illustrative and not limitative. Embodiments of the present invention are not limited by any RF frequency or any type of antenna, such as dipole, loop, patch, horn or otherwise, used to receive or transmit the RF signals. Embodiments of the present invention are not limited by the type, shape or voltage requirement of a rechargeable battery that may be wirelessly charged. Embodiments of the present disclosure are not limited by the type of circuitry used to convert and condition the RF signal to a DC voltage. Embodiments of the present disclosure are not limited by the housing used to enclose and wirelessly charge a rechargeable battery. Other additions, subtractions or modifications are obvious in view of the present disclosure and are intended to fall within the scope of the appended claims.

What is claimed is:

1. A wireless charging system comprising:
   a first board adapted to receive a bottom portion of a rechargeable battery, said first board comprising:
   a ground plane;
   a first plurality of receptacles positioned along a perimeter of the first board; and
   circuitry adapted to convert a received RF signal to a DC voltage for delivery to the rechargeable battery when the rechargeable battery is positioned over the first board;
   a plurality of rectenna boards each associated with and adapted to be inserted into a different one of the first plurality of receptacles, each rectenna board comprising a plurality of receive antennas for receiving the RF signal, wherein the plurality of rectenna boards are adapted to enclose the rechargeable battery when the rechargeable battery is positioned over the first board; and
   a second board adapted to engage with the plurality of rectenna boards and cover a top portion of the rechargeable battery when the rechargeable battery is positioned over the first board.

2. The wireless charging system of claim 1 further comprising the rechargeable battery.

3. The wireless charging system of claim 1 further comprising:
   a third board adapted to be inserted in a second receptacle positioned on the first board, the third board being further adapted to be connected to a positive terminal of the rechargeable battery when the rechargeable battery is positioned over the first board.

4. The wireless charging system of claim 1 wherein the circuitry comprises an RF-to-DC converter, a DC-to-DC converter, a power management circuit, a wireless communication circuit, and a controller.

5. A method of charging a rechargeable battery using RF signals, the method comprising:
   placing a bottom portion of a rechargeable battery on a first board comprising:
   a ground plane coupled to a negative terminal of the battery;
   a first plurality of receptacles positioned along a perimeter of the first board; and
   circuitry adapted to convert the RF signal to a DC voltage for delivery and charging the rechargeable battery;
   inserting a plurality of rectenna boards into the first plurality of receptacles, each rectenna board comprising a plurality of receive antennas for receiving the RF signal, wherein the plurality of rectenna boards are adapted to enclose the perimeter of the rechargeable battery along a height of the rechargeable battery; and
   covering a top portion of the rechargeable battery with a second board adapted to engage with the plurality of rectenna boards.

6. The method of claim 5 further comprising:

inserting a third board in a second receptacle positioned on the first board, the third board being further adapted to be connected to a positive terminal of the recharge-able battery.

7. The method of claim 6 wherein the second board engages with the plurality of rectennas using a plurality of protrusions and cavities.

8. The method of claim 5 wherein the circuitry comprises an RF-to-DC converter, a DC-to-DC converter, a power management circuit, a wireless communication circuit, and a controller.

\* \* \* \* \*